United States Patent
Mizuno et al.

(10) Patent No.: US 6,723,912 B2
(45) Date of Patent: Apr. 20, 2004

(54) SPACE PHOTOVOLTAIC POWER GENERATION SYSTEM

(75) Inventors: Tomohiro Mizuno, Tokyo (JP); Hiroyuki Sato, Tokyo (JP); Izuru Naito, Tokyo (JP); Izumi Mikami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/160,091

(22) Filed: Jun. 4, 2002

(65) Prior Publication Data

US 2003/0098057 A1 May 29, 2003

(30) Foreign Application Priority Data

Nov. 29, 2001 (JP) ........................................ 2001-364032

(51) Int. Cl.[7] ........................... H01L 31/042; B64G 1/44
(52) U.S. Cl. ....................... 136/292; 136/244; 136/246; 244/173; 322/2 R; 342/354; 342/352
(58) Field of Search ................................. 136/244, 292, 136/246; 244/173; 322/2 R; 342/354, 352

(56) References Cited

U.S. PATENT DOCUMENTS

| | | | | | |
|---|---|---|---|---|---|
| 3,781,647 | A | * | 12/1973 | Glaser ........................ | 322/2 R |
| 4,364,532 | A | * | 12/1982 | Stark .......................... | 244/30 |
| 4,368,415 | A | * | 1/1983 | Henderson et al. ......... | 322/2 R |
| 5,019,768 | A | * | 5/1991 | Criswell et al. ............. | 322/2 R |
| 5,223,781 | A | * | 6/1993 | Criswell et al. ............. | 322/2 R |
| 6,492,586 | B2 | * | 12/2002 | Mikami et al. .............. | 136/292 |
| 6,492,940 | B2 | * | 12/2002 | Mikami et al. .............. | 342/354 |
| 6,495,751 | B2 | * | 12/2002 | Mikami et al. .............. | 136/292 |
| 6,528,719 | B2 | * | 3/2003 | Mikami et al. .............. | 136/292 |
| 2003/0098058 | A1 | * | 5/2003 | Takada et al. ............... | 136/244 |
| 2003/0192586 | A1 | * | 10/2003 | Takada et al. ............... | 136/292 |

OTHER PUBLICATIONS

U.S. Doe abd NASA Reference System Report, pp. 10–14, "Satellite Power System: Concept Development and Evaluation Program", Oct. 1978.

* cited by examiner

*Primary Examiner*—Alan Diamond
(74) *Attorney, Agent, or Firm*—Oblon, Spivak, McClelland, Maier & Neustadt, P.C.

(57) ABSTRACT

A power generation satellite has a photoelectric conversion unit for converting sunlight into electric energy, a transmission frequency conversion unit for performing frequency conversion of the electric energy to a microwave, a microwave control unit for controlling the amplitude, the phase, or the amplitude and the phase of the microwave, and a transmitting antenna for radiating the microwave. A plurality of the power generation satellites are placed in space to form a power generation satellite group and an array antenna having the transmitting antennas of the power generation satellites in the power generation satellite group as element antennas is formed.

4 Claims, 10 Drawing Sheets

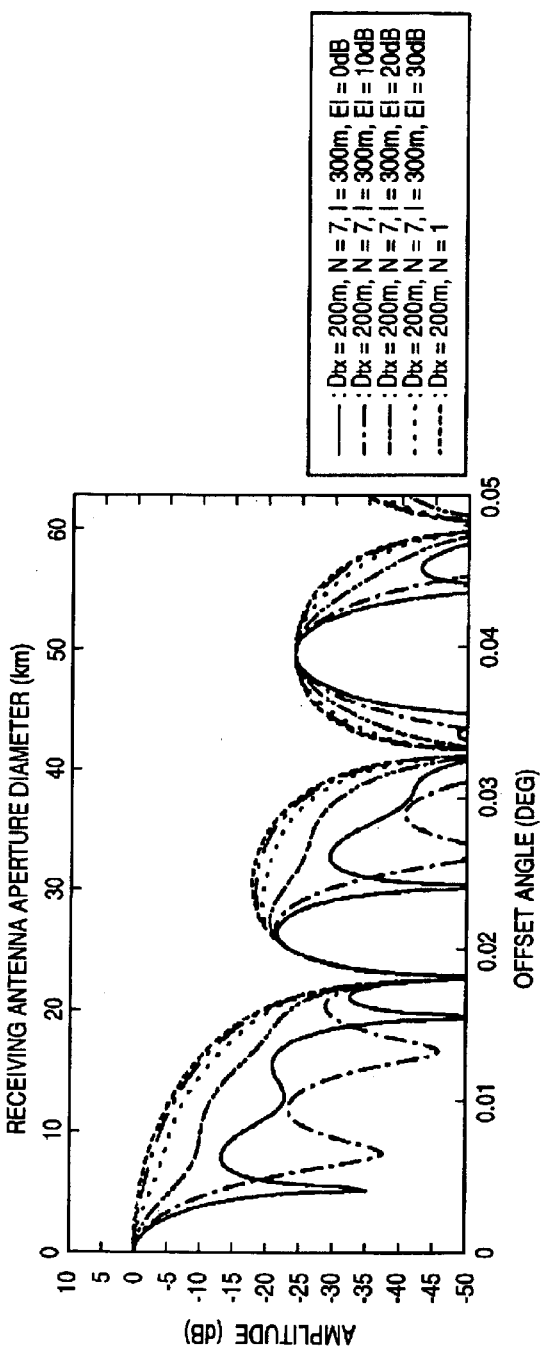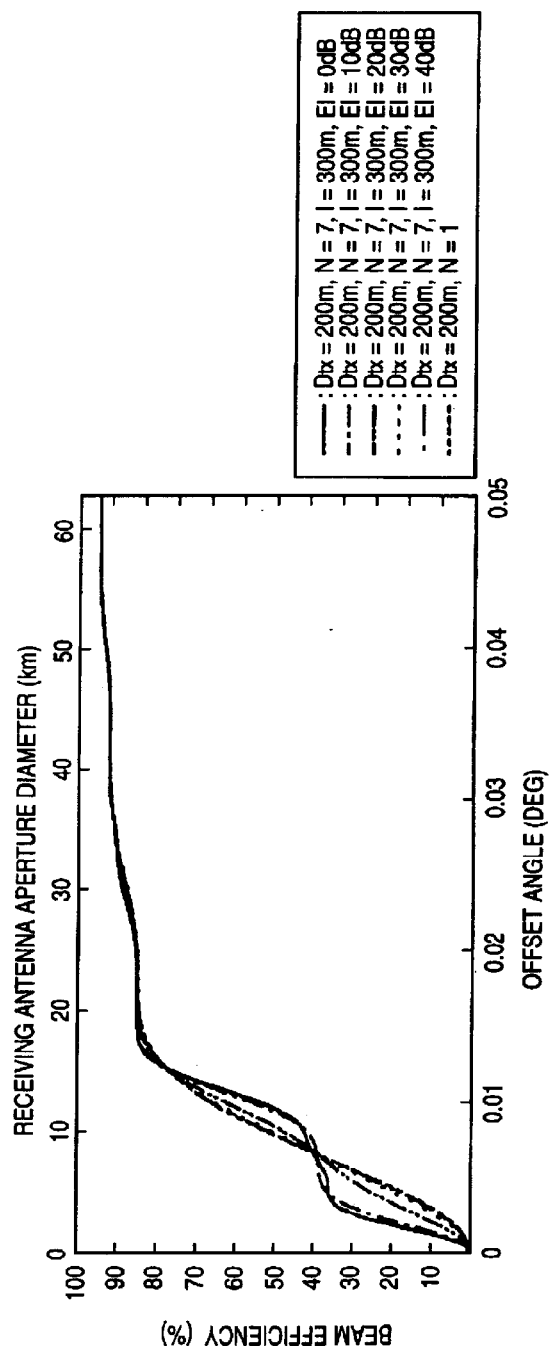
FIG. 7(a)
FIG. 7(b)

SPACE PHOTOVOLTAIC POWER GENERATION SYSTEM

BACKGROUND OF THE INVENTION

1. Field of the Invention

This invention relates to a space photovoltaic generation system wherein sunlight is converted into electric energy in space and the electric power is transmitted by microwave, etc., and is received at a power base for use as electric energy.

2. Description of the Related Art

Because of finitude of electric energy based on the fossil fuels of oil, coal, natural gas, etc., and adversely affecting the environment, attention is focused on sunlight as an energy source to replace the electric energy based on the fossil fuels. Ground photovoltaic generation, etc., exists as one mode of electric energy use based on sunlight, but it is hard to stably supply electric power because of the sunshine amount between day and night, the effect of weather, etc., and the efficiency is poor. On the other hand, atmospheric attenuation scarcely exists in space and the solar energy density in space even in the vicinity of the earth reaches five to 10 times that on the ground; the lure of solar energy use in space is large. Research and development on a space photovoltaic generation system wherein solar energy in space is converted into electric energy and the electric energy is transmitted by microwave, etc., and is received at a specific location is underway.

As an example of a related art of such a space photovoltaic generation system, FIG. 9 is drawing to show the configuration of a space photovoltaic generation system in a related art in "U.S.DOE and NASA Reference System Report, "Satellite Power System: Concept Development and Evaluation Program", DOE/ER-0023, 1978." In FIG. 9, numeral 4 denotes a power generation satellite, numeral 5 denotes a photoelectric conversion unit formed of solar cell panels installed in the power generation satellite 4, numeral 9 denotes a transmitting antenna mounted on the power generation satellite 4, numeral 10 denotes a microwave radiated from the transmitting antenna 9, numeral 11 denotes a power base, and numeral 12 denotes a receiving antenna placed in the power base 11.

In the space photovoltaic generation system shown in FIG. 9, the photoelectric conversion unit 5 installed in the power generation satellite 4 performs photoelectric conversion of sunlight. The generated power energy is transmitted through the transmitting antenna 9 to the power base 11 as the microwave 10 and is received at the receiving antenna 12 in the power base 11. In the example cited as the related art, the photoelectric conversion unit 5 installed in the power generation satellite 4 has a size of 5×10 km, the transmitting antenna 9 has a diameter of 1 km, and the receiving antenna 12 in the power base 11 has a size of 10×13 km. The power generation satellite 4 has a weight of 50000 tons. The total size of the solar cell panels forming the photoelectric conversion unit 5 is determined in response to the amount of electric power generated by the power generation satellite 4, and the sizes of the transmitting antenna 9 and the receiving antenna 12 are determined in response to the receiving power efficiency.

Here, defining the value of normalizing electric power $P_{rx}$ arriving at the aperture area of the receiving antenna 12 having an aperture diameter $D_{rx}$ based on electric power $P_{tx}$ transmitted through the transmitting antenna 9 having an aperture diameter $D_{tx}$ as receiving power efficiency $\eta_b$, if distance d between the transmitting antenna 9 and the receiving antenna 12 is sufficiently long so as to form a Fraunhofer region (region assumed to be electrically infinite distance) and the aperture distribution of the transmitting antenna 9 is uniform in both amplitude and phase, radiation field distribution E of the transmitting antenna 9 and the receiving power efficiency $\eta_b$ are represented by the following expressions:

$$E = \frac{J_1(Z_\theta)}{Z_\theta} \quad (1)$$

$$\eta_b = \frac{P_{rx}}{P_{tx}} = \frac{\int_0^\theta |E|^2 Z_\theta dZ_\theta}{\int_0^\pi |E|^2 Z_\theta dZ_\theta} = 1 - J_0^2(Z_\theta) - J_1^2(Z_\theta) \quad (2)$$

$$Z_\theta = \pi \frac{D_{tx}}{\lambda} \sin(\theta) \quad (3)$$

$$\theta = \tan^{-1}\left(\frac{D_{rx}}{2d}\right) \quad (4)$$

where $\lambda$ is the wavelength of the microwave 10 and $J_n(x)$ is a Bessel function of the order n. From expression (2), it is seen that the aperture diameters of both the transmitting antenna 9 and the receiving antenna 12 need to be made large to enhance the receiving power efficiency $\eta_b$. If the transmitting antenna 9 and the receiving antenna 12 differ in aperture shape or aperture distribution, the calculation expression of the receiving power efficiency $\eta_b$ also varies accordingly. However, if the aperture diameter of the transmitting antenna 9 or the receiving antenna 12 is made large, the receiving power efficiency $\eta_b$ is always enhanced.

If the distance d between the transmitting antenna 9 and the receiving antenna 12 is sufficiently large as compared with the aperture diameter $D_{rx}$ of the receiving antenna 12, the following expression holds according to expressions (3) and (4):

$$Z_\theta \cong \pi \frac{D_{tx} D_{rx}}{2\lambda d} \quad (5)$$

From expression (5), if either of the aperture diameters of the transmitting antenna 9 and the receiving antenna 12 required for achieve one receiving power efficiency is determined, the aperture diameter of the other is also determined. To provide high receiving power efficiency, the aperture diameter of the transmitting antenna 9 or the receiving antenna 12 needs to be made large. FIGS. 10(a) and 10(b) show the characteristics of the radiation field distribution of the transmitting antenna 9 in the Fraunhofer region and receiving power efficiency if the wavelength $\lambda$ of the microwave 10 radiated from the transmitting antenna 9 is 52 mm (frequency 5.8 GHz). From the figures, it is seen that, for example, if the power generation satellite 4 is placed in stationary orbit above the ground of 36000 km and the aperture diameter of the transmitting antenna 9 is 1 km and the aperture distribution is uniform, the aperture diameter of the receiving antenna 12 needs to be about 7 km to provide receiving power efficiency 90%.

From expression (2), if the transmission frequency of the microwave 10 radiated from the transmitting antenna 9 is made high (the wavelength is shortened), the aperture diameter of the transmitting antenna 9 or the receiving antenna 12 can be lessened, but a problem of interfering with the frequency bands used with the already existing satellite communications, ground microwave communications, etc., is involved. To place the power base 4 on the ground, generally as the frequency becomes high, an atmospheric loss cannot be ignored and the receiving power efficiency is lowered. Thus, the frequency range used for the microwave 10 is limited. 2-GHz band (2.45 GHz) and 5-GHz band (5.8 GHz) are named as the frequencies assumed in the space photovoltaic generation system so far.

To increase the amount of electric power generated by the power generation satellite 4, the area of the solar cell panels forming the photoelectric conversion unit 5, a reflecting mirror for condensing sunlight, or the like needs to be increased.

By the way, the power generation satellite installing the solar cell panels and the transmitting antenna needs to be hoisted into predetermined orbit in space using a rocket or a shuttle. On the other hand, the dimensions and weight that can be carried in a rocket, etc., are limited and thus if the dimensions or weight of the solar cell panels and the transmitting antenna contained in the power generation satellite are large, it is physically difficult to hoist and develop them into space at a time.

Then, a method of launching the components of the power generation satellite more than once is possible. In this case, however, it is necessary to assemble the components in space or at a similar altitude and then hoist the power generation satellite into predetermined orbit. Also in this case, if the dimensions or weight of the solar cell panels and the transmitting antenna contained in the final power generation satellite are large, it becomes necessary to launch the components a large number of times, bearing the costs is large, and the time period to the actual operation of the power generation satellite is also long; the barrier against realizing the method is high. Further, there is a problem of complicating electric, mechanical, and thermal interfaces to assemble the components and to assemble the components into the power generation satellite at a lower altitude than the Van Allen belt, when the power generation satellite passes through the Van Allen belt, the electronic machines, the solar cell panels, etc., are broken and are degraded in performance due to the effect of radiation, etc.; this is also a problem.

The transmitting antenna mounted on the power generation satellite needs to transmit a microwave precisely to the target power base. If the attitude of the power generation satellite is controlled with very high accuracy, there is no problem. However, if the distance between the power generation satellite and the power base is very long or if the aperture area of the receiving antenna in the power base is small, the beam direction from the transmitting antenna needs to be controlled independently of the attitude of the power generation satellite. To satisfy such requirement, a method of adopting an array antenna as the transmitting antenna and electrically scanning a beam is possible. However, not to produce an unnecessary beam called grating lobe, generally element antennas need to be arranged with spacing of one wavelength or less throughout the antenna aperture. If the aperture area of the transmitting antenna is very large, a large number of element antennas need to be arranged in proportion to the very large aperture area. For example, assuming that the wavelength of the microwave radiated from the transmitting antenna is 52 mm (frequency 5.8 GHz) and that the aperture diameter of the transmitting antenna is 1 km, if the element antennas are arranged with spacing of one wavelength, the number of the element antennas reaches about 290 millions. Therefore, the scale of manufacturing and assembling the transmitting antenna is very large and the manufacturing difficulty also becomes high; this is a problem.

On the other hand, if the aperture area of the receiving antenna is made large, the aperture area of the transmitting antenna can be lessened. However, to place the power base on the ground, from the viewpoint of securing land, it becomes difficult to secure an enormous area physically and in cost. To place the power base in space or on the moon, a similar problem to that involved in launching the power generation satellite mentioned above still arises.

SUMMARY OF THE INVENTION

It is therefore an object of the invention to provide a space photovoltaic generation system for making it possible to minimize the scale of a receiving antenna in a power base without impairing the receiving power efficiency unnecessarily if the transmitting antenna mounted on each power generation satellite is made small to remove the problems involved in the large scale of the transmitting antenna mounted on each power generation satellite in the related art.

According to the invention, there is provided a space photovoltaic generation system including a plurality of power generation satellites and a power base. Each of power generation satellites has a photoelectric conversion unit, a transmission frequency conversion unit, a microwave control unit, and a transmitting antenna. The photoelectric conversion unit converts sunlight into electric energy. The transmission frequency conversion unit performs frequency conversion of the electric energy provided by the photoelectric conversion unit to a microwave. The microwave control unit controls at least one of the amplitude and the phase of the microwave output by the transmission frequency conversion unit. The transmitting antenna radiates the microwave. The power base has a receiving antenna and a reception frequency conversion unit. The receiving antenna receives the microwave radiated from the power generation satellites. The reception frequency conversion unit performs frequency conversion of the microwave received at the receiving antenna to one of DC and low-frequency commercial power. The plurality of power generation satellites are placed in space to form a power generation satellite group. An array antenna having the transmitting antennas of the power generation satellites in the power generation satellite group as element antennas is formed.

BRIEF DESCRIPTION OF THE DRAWINGS

In the accompanying drawings:

FIGS. 7(a) and 7(b) are schematic representations to show an example of the radiation field distribution and receiving power efficiency in a space photovoltaic generation system according to embodiment 3 of the invention;

DETAILED DESCRIPTION OF THE PREFERRED EMBODIMENTS

Embodiment 1.

Figure 1:
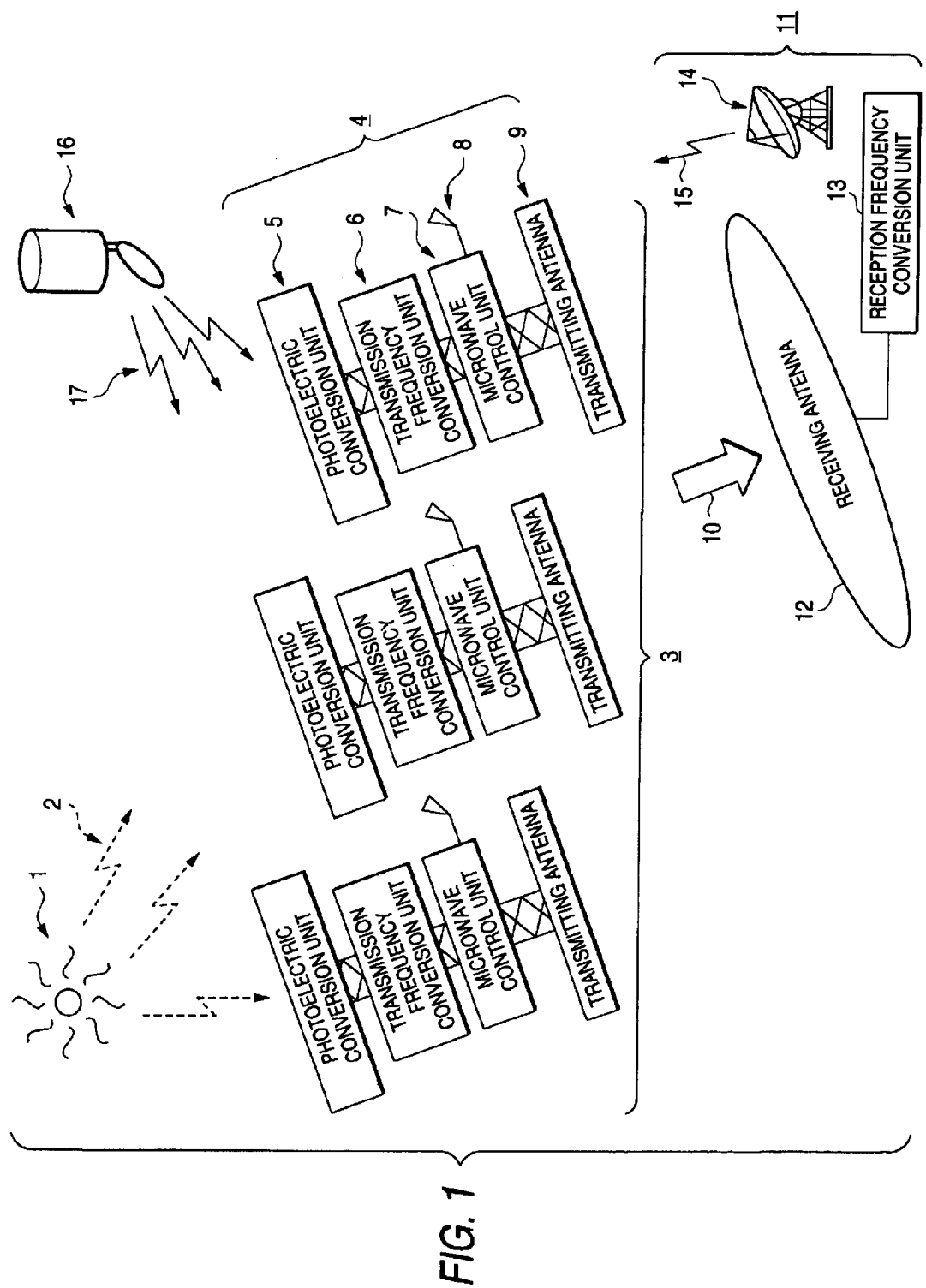
FIG. 1 is a drawing to show the configuration of a space photovoltaic generation system according to embodiments 1 to 5 of the invention.

A space photovoltaic generation system according to an embodiment 1 of the invention will be discussed with reference to the accompanying drawings. FIG. 1 is a drawing to show the configuration of the space photovoltaic generation system according to the embodiment 1 of the invention.

In FIG. 1, numeral 1 denotes the sun, numeral 2 denotes sunlight radiated from the sun 1, numeral 3 denotes a power generation satellite group, numeral 4 denotes each of power generation satellites making up the power generation satellite group, numeral 5 denotes photoelectric conversion unit, numeral 6 denotes a transmission frequency conversion unit, numeral 7 denotes microwave control unit, numeral 8 denotes a control signal reception unit for inputting a control signal to the microwave control unit, and numeral 9 denotes a transmitting antenna. The members 5 to 9 are components of the power generation satellite 4. Numeral 10 denotes a microwave radiated through the transmitting antenna 9, numeral 11 denotes a power base, numeral 12 denotes a receiving antenna for receiving the microwave 10, numeral 13 denotes a reception frequency conversion unit for performing frequency conversion of the received microwave 10 to DC or low-frequency commercial power, numeral 14 denotes a power generation satellite control antenna for transmitting a signal to the power generation satellite group 3, numeral 15 denotes a command transmitted through the power generation satellite control antenna 14, numeral 16 denotes a control satellite for controlling each power generation satellite 4 based on the command 15, and numeral 17 denotes a power generation satellite control signal for controlling each power generation satellite 4. The members 12 to 14 are components of the power base 11.

Next, the operation principle of the space photovoltaic generation system according to the embodiment 1 of the invention will be discussed with reference to the accompanying drawings. In the space photovoltaic generation system shown in FIG. 1, the photoelectric conversion unit 5 included in each of the power generation satellites 4 placed in space converts the sunlight 2 radiated from the sun 1 into electric energy. The photoelectric conversion unit 5 may be a combination of solar cell panels and a light condensing optical system for condensing the sunlight 2 or may be simply made up of only solar cell panels. Frequency conversion of the electric energy provided by the photoelectric conversion unit 5 to a microwave band is performed by the transmission frequency conversion unit 6 made up of a semiconductor amplifier, an electron tube, etc., and the conversion result is given an amplitude phase required for transmitting through the transmitting antenna 9 by the microwave control unit 7. The microwave 10 is radiated from the transmitting antenna 9 to the power base 11 installed at a predetermined location.

The power generation satellite group 3 forms an array antenna with the transmitting antennas 9 mounted on the power generation satellites 4 as element antennas. Therefore, to use the transmitting antennas 9 mounted on the power generation satellites 4 as the elements of the array antenna, each microwave control unit 7 controls the excitation amplitude phase of the microwave 10 so that the microwave 10 propagates to the power base 11. To control the microwave 10, the excitation phases of the transmitting antennas 9 need to be controlled in response to the positions and the attitudes of the power generation satellites 4 so as to provide common phase in the direction of the power base 11. Then, the command 15 indicating the position of the power base 11 is transmitted from the power generation satellite control antenna 14 provided at the power base 11 to the control satellite 16. The control satellite 16 monitors the positions and the attitudes of the power generation satellites 4 by a laser, an electromagnetic wave, etc., and calculates the excitation amplitude phase required for the transmitting antenna 9 of each of the power generation satellites 4 from the position information and the command 15 and then transmits the power generation satellite control signal 17. Each power generation satellite 4 receives the power generation satellite control signal 17 by the control signal reception unit 8 and inputs the signal to the microwave control unit 7.

The control satellite 16 calculates the excitation amplitude phase required for the transmitting antenna 9 of each of the power generation satellites 4, but need not necessarily calculate the excitation amplitude phase and each power generation satellite 4 may calculate the excitation amplitude phase. If the positions and the attitudes of the power generation satellites 4 are monitored on the ground or if the power generation satellite 4 itself can monitor its position and attitude, the control satellite 16 is not necessarily required. In this case, the control signal reception unit 8 may become unnecessary.

The microwave 10 thus transmitted from the power generation satellite group 3 is received at the receiving antenna 12 provided at the power base 11 and is subjected to frequency conversion to a DC or a low frequency by the reception frequency conversion unit 13 for use as electric power. The receiving antenna 12 and the reception frequency conversion unit 13 may be integral like a general Rectenna or a plurality of receiving antenna 12 and a plurality of reception frequency conversion unit 13 may be placed in the required aperture area.

The receiving power efficiency of the space photovoltaic generation system according to the embodiment 1 will be discussed. FIGS. 2(a) and 2(b) show the characteristics of the radiation field distribution and the receiving power efficiency as the array antenna formed by the power generation satellite group 3. The figures assume that wavelength λ of the microwave 10 is 52 mm (frequency 5.8 GHz), that the power generation satellites 4 are placed in a square arrangement, that the aperture distribution of the transmitting antenna 9 mounted on each of the power generation satellites 4 is uniform, that the aperture diameter of the transmitting antenna 9 is 200 m, that the number of the power generation satellites, N, is 25 (5×5), that all power generation satellites transmit in the same amplitude phase (namely, the excitation distribution of the array antenna formed by the power generation satellite group 3 is uniform), and that distance d between the transmitting antenna 9 and the receiving antenna 12 can be assumed to be a Fraunhofer region. For comparison purposes, the characteristics when the transmitting antenna 9 having the aperture diameter 200 m is installed singly and when the transmitting antenna 9 having the aperture diameter 1 km, which forms the same aperture area as the whole array antenna formed by the power generation satellite group 3, is installed singly are also shown.

Figure 2:
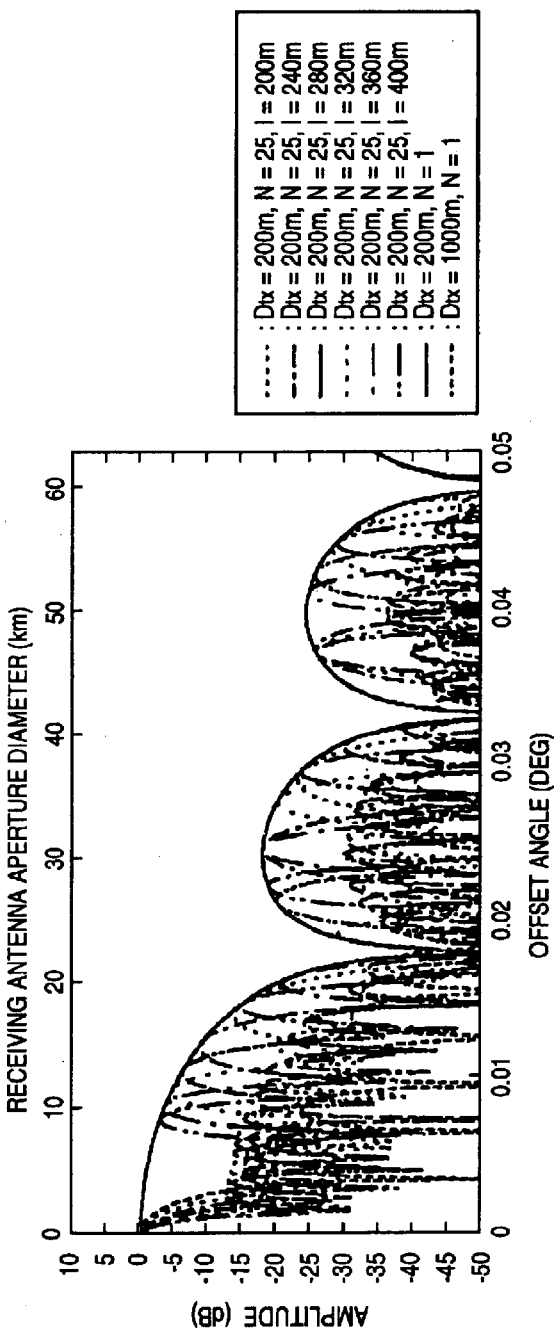
FIGS. 2(a) and 2(b) are schematic representations to show an example of the radiation field distribution and receiving power efficiency in the space photovoltaic generation system according to embodiment 1 of the invention.
Figure 2:
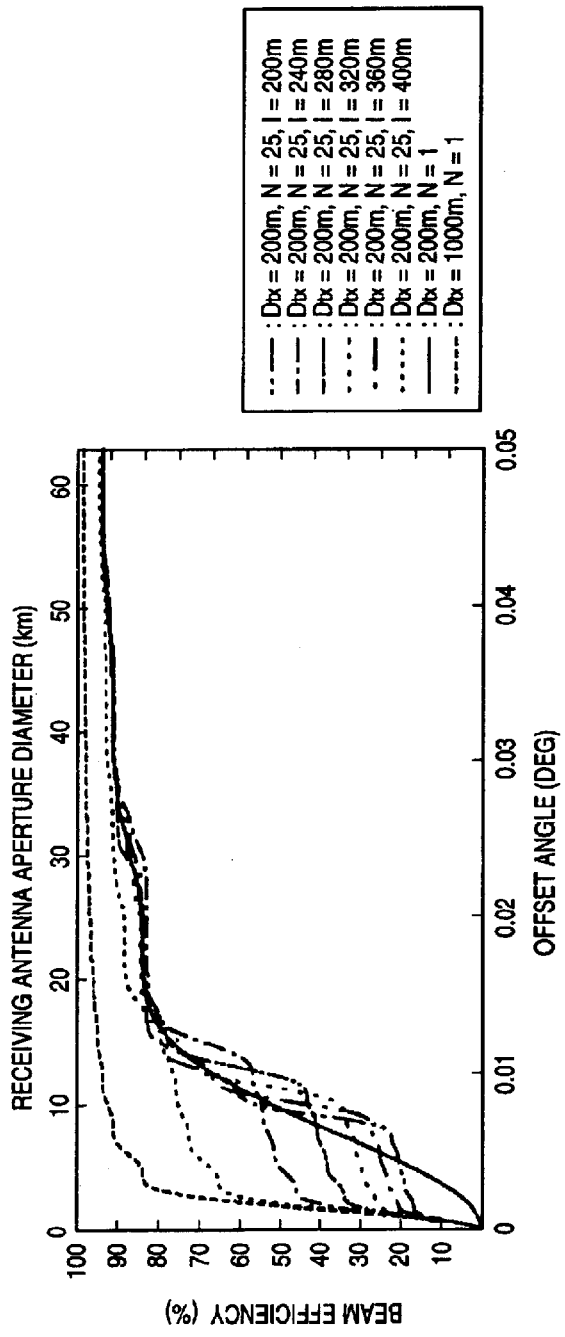
Figure 3:
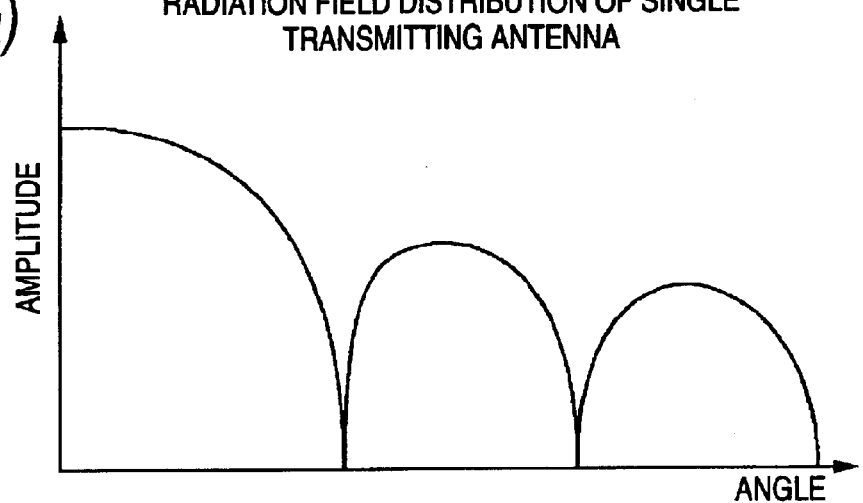
FIGS. 3(a) to 3(c) are schematic representations to describe the radiation field distribution of an array antenna.
Figure 3:
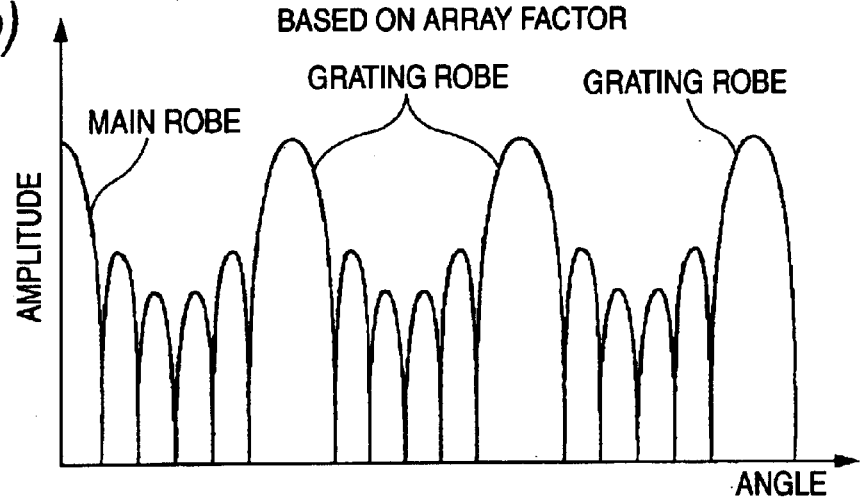
Figure 3:
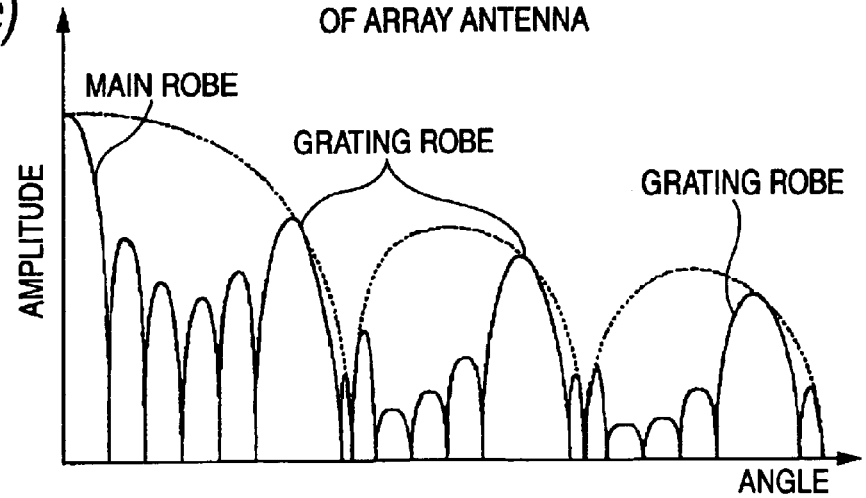

From FIG. 2(*a*), it is seen that the radiation field distribution when the transmitting antennas 9 each having the aperture diameter 200 m are put into an array has a beam width responsive to the aperture diameter when the whole array antenna is assumed to be one aperture antenna with the radiation field distribution when the transmitting antenna 9 having the aperture diameter 200 m is installed singly as an envelope and produces a grating lobe in the angle cycle determined by the element spacing l (placement spacing between the power generation satellites 4). FIGS. 3(*a*) to 3(*c*) are schematic representations to describe the radiation field distribution of the array antenna. The radiation field distribution of the array antenna shown in FIG. 3(*c*) is given as the product of the radiation field distribution of the transmitting antenna 9 as an element antenna and the radiation field distribution based on array factors shown in FIG. 3(*b*). The radiation field distribution based on the array factors is determined by the element spacing length relative to the wavelength, the number of elements, the element arrangement, and the excitation coefficient distribution of the elements.

From FIG. 2(*b*), it is seen that the receiving power efficiency when the transmitting antennas 9 each having the aperture diameter 200 m are put into an array almost matches that when the transmitting antenna 9 having the aperture diameter 1 km is installed singly within the offset angle range corresponding to the main lobe in any element spacing l (spacing between the power generation satellites 4). As the element spacing becomes large, the beam width becomes narrow and the electric power contained in the main lobe decreases and therefore the value of the receiving power efficiency topping out at the offset angle corresponding to the first side lobe is kept low. However, the receiving power efficiency when the transmitting antennas 9 are put into an array is improved as compared with the receiving power efficiency when the transmitting antenna 9 having the aperture diameter 200 m is installed singly at the offset angle corresponding to the first grating lobe of the radiation field distribution in any element spacing. Further, if the offset angle becomes large in the vicinity of the first null point when the transmitting antenna 9 having the aperture diameter 200 m is installed singly, the characteristic of the receiving power efficiency approaches the receiving power efficiency when the transmitting antenna 9 having the aperture diameter 200 m is installed singly.

Figure 4:
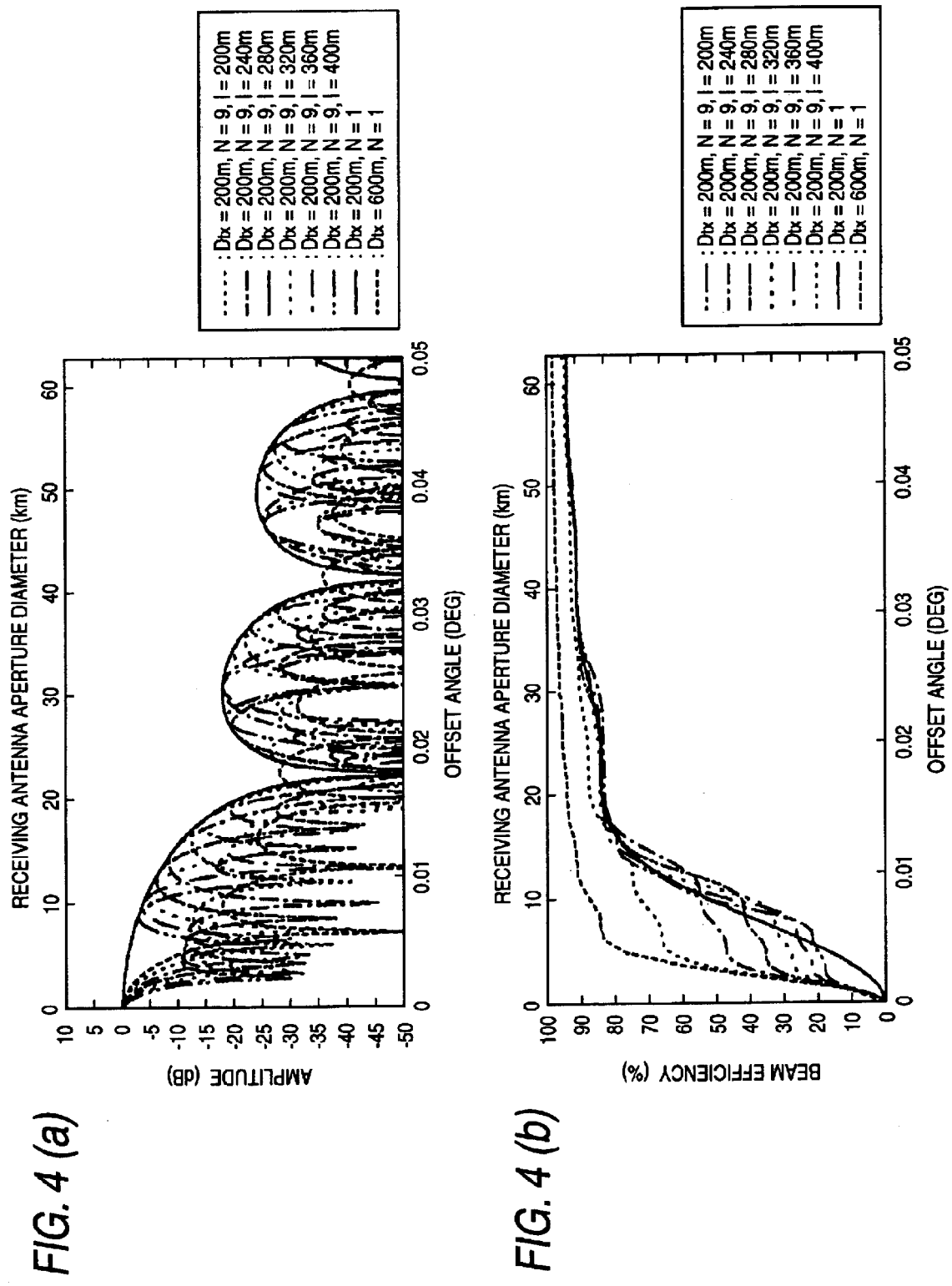
FIGS. 4(a) and 4(b) are schematic representations to show another example of the radiation field distribution and receiving power efficiency in the space photovoltaic generation system according to embodiment 1 of the invention.

Next, FIGS. 4(*a*) and 4(*b*) show the characteristics of the radiation field distribution and the receiving power efficiency as the array antenna formed by the power generation satellite group 3 when the number of the power generation satellites, N, is 9 (3×3) and other conditions are the same as those in FIGS. 2(*a*) and 2(*b*). For comparison purposes, FIGS. 4(*a*) and 4(*b*) show the characteristics when the transmitting antenna 9 having the aperture diameter 200 m is installed singly and when the transmitting antenna 9 having the aperture diameter 600 m, which forms the same aperture area as the whole array antenna formed by the power generation satellite group 3.

From FIGS. 4(*a*) and 4(*b*), as in FIGS. 2(*a*) and 2(*b*), it is seen that the receiving power efficiency when the transmitting antenna 9 having the aperture diameter 600 m is installed singly almost matches the receiving power efficiency when the transmitting antennas 9 each having the aperture diameter 200 m are put into an array within the offset angle range corresponding to the main lobe, and that other characteristics are also similar to those in FIGS. 2(*a*) and 2(*b*).

Therefore, to give the aperture diameter of the receiving antenna 12 within the range of the magnitude corresponding to the main lobe of the radiation field distribution based on the array antenna formed by the power generation satellite group 3, electric power can be transmitted from the power generation satellite group 3 to the power base 11 without much impairing the receiving power efficiency as compared with the case where the transmitting antenna 9 which forms the same aperture area as the whole array antenna formed by the power generation satellite group 3 exists singly.

To give the aperture diameter of the receiving antenna 12 within the range of the magnitude corresponding to the first grating lobe of the radiation field distribution when the transmitting antennas 9 are put into an array, the receiving power efficiency can be enhanced as compared with that when the transmitting antenna 9 exists singly.

Further, if the number of the power generation satellites 4 changes, the receiving power efficiency equivalent to that of the single transmitting antenna 9 which forms the same aperture area as the whole array antenna formed by the power generation satellite group 3 is provided, so that while power generation satellites 4 are added in sequence, the generated electric power and the power generation efficiency of the space photovoltaic generation system can be enhanced and the space photovoltaic generation system can be administrated for development.

As described above, the transmitting antenna 9 of the power generation satellite 4 can be made smaller than the single transmitting antenna 9 which forms the same aperture area as the whole array antenna formed by the power generation satellite group 3, so that the load at launching time with a rocket, etc., can be lessened.

Embodiment 2.

A space photovoltaic generation system according to an embodiment 2 of the invention will be discussed with reference to the accompanying drawings. The configuration of the space photovoltaic generation system according to the embodiment 2 is the same as that in the embodiment 1 previously described with reference to FIG. 1 except that the aperture amplitude distribution of a transmitting antenna 9 is made a tapered distribution.

Figure 5:
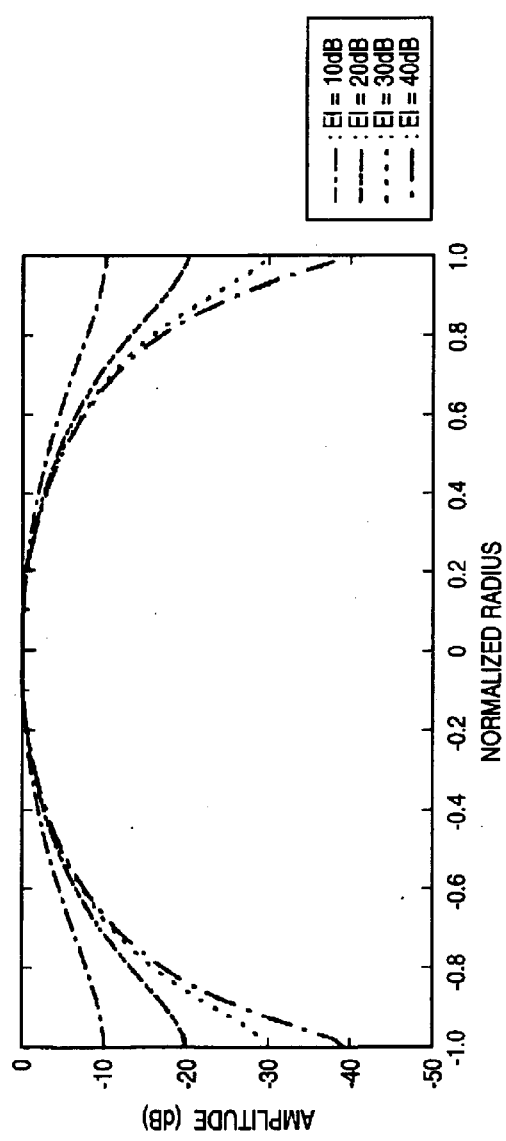
FIGS. 5(a) and 5(b) are schematic representations to describe the aperture amplitude distribution of an antenna and the radiation field distribution.
Figure 5:
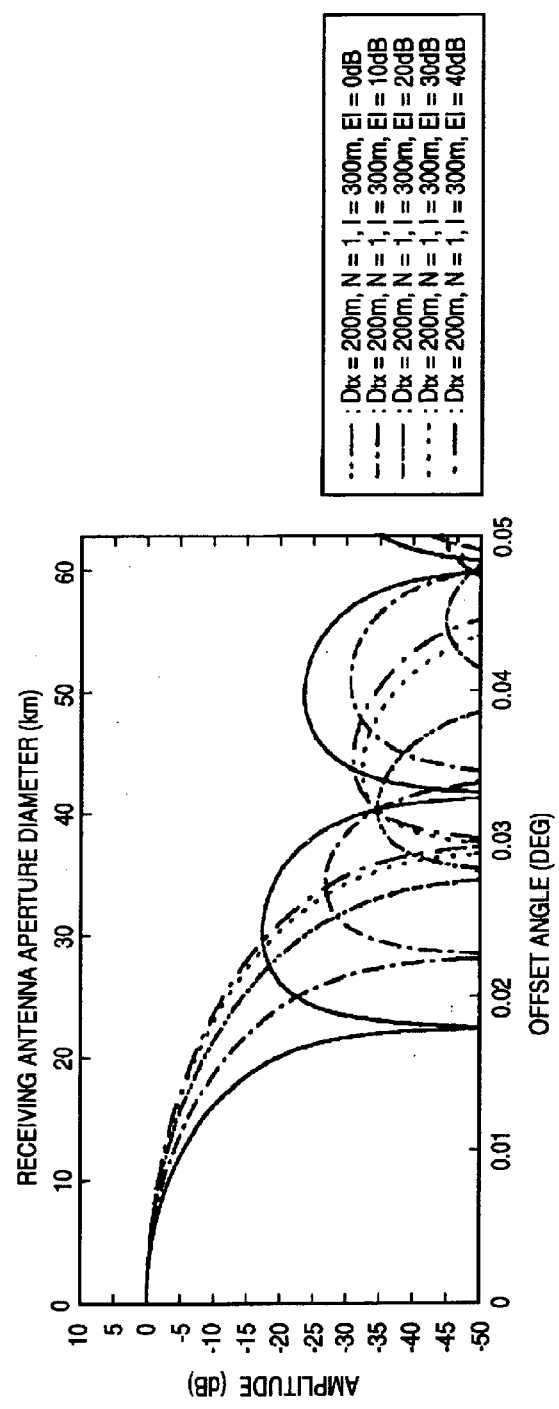

FIGS. 5(*a*) and 5(*b*) show the shape of the taper distribution given by the following expression as aperture amplitude distribution Ea of the transmitting antenna 9 and the radiation field distribution at the time. In the following expressions, r is the normalized radius in the aperture of the transmitting antenna 9 and p and b are constants; p distributes to the relative shape of the tapered distribution and b distributes to edge level (amplitude ratio between aperture center and aperture end part) El. In expression (7), the edge level El is defined in a true value.

$$E_a = \frac{b + (1-r^2)^p}{b+1} \quad (6)$$

$$b = \frac{El}{1-El} \quad (7)$$

In FIGS. 5(*a*) and 5(*b*), the constant p in expression (6) is 2 and the constant b is given in response to the edge level El. From FIG. 5(*b*), it is seen that the edge level El of the aperture amplitude distribution Ea is lowered, whereby the beam width of the main beam is widened and the side lobe level is lowered.

Figures 6A, 6B:
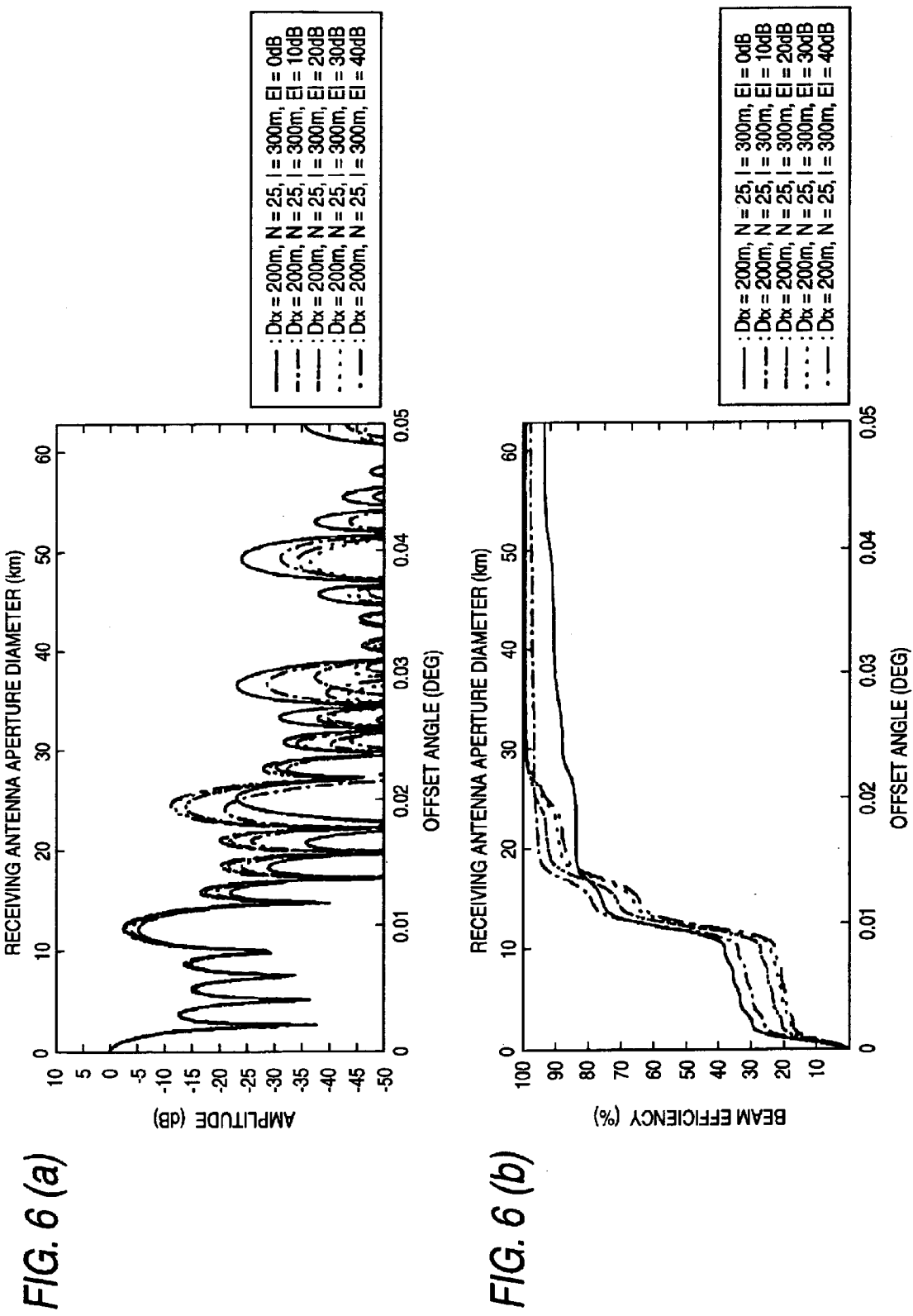
FIGS. 6(a) and 6(b) are schematic representations to show an example of the radiation field distribution and receiving power efficiency in a space photovoltaic generation system according to embodiment 2 of the invention.

The receiving power efficiency of the space photovoltaic generation system according to the embodiment 2 will be discussed. FIGS. 6(a) and 6(b) show the characteristics of the radiation field distribution and the receiving power efficiency as an array antenna formed by a power generation satellite group 3 when the tapered distribution shown in FIG. 5 is the aperture amplitude distribution of the transmitting antenna 9. FIGS. 6(a) and 6(b) assume that wavelength λ of a microwave 10 is 52 mm (frequency 5.8 GHz), that power generation satellites 4 are placed in a square arrangement with a spacing of 300 m, that the aperture diameter of the transmitting antenna 9 mounted on each of the power generation satellites 4 is 200 m, that the number of the power generation satellites, N, is 25 (5×5), that all power generation satellites transmit in the same amplitude phase (namely, the excitation distribution of the array antenna formed by the power generation satellite group 3 is uniform), and that distance d between the transmitting antenna 9 and a receiving antenna 12 can be assumed to be a Fraunhofer region.

From FIGS. 6(a) and 6(b), it is seen that the receiving power efficiency changes depending on the edge level when the aperture amplitude distribution of the transmitting antenna 9 is the tapered distribution and that the receiving power efficiency at the offset angle corresponding to from the first grating lobe of the radiation field distribution to the second grating lobe reaches the highest when the edge level is about −10 dB and at this time, 75% to 90% receiving power efficiency is provided. At the offset angle exceeding the second grating lobe, the lower the edge level, the higher the receiving power efficiency, and when the edge level is lower than −10 dB and the receiving power efficiency reaches 97% or more. This almost bears comparison with the receiving power efficiency of the transmitting antenna 9 having the aperture diameter 1 km shown in FIG. 2(b).

Therefore, to give the aperture diameter of the receiving antenna 12 within the range of the magnitude corresponding to the first grating lobe or more of the radiation field distribution based on the array antenna formed by the power generation satellite group 3, the receiving power efficiency can be still more enhanced as compared with that when the transmitting antenna 9 exists singly.

Here, the tapered distribution represented by expression (6) is used, but a distribution, such as a Gauss distribution, a Taylor distribution, or a Chebyshev distribution, may be used.

Embodiment 3.

A space photovoltaic generation system according to an embodiment 3 of the invention will be discussed with reference to the accompanying drawings. The configuration of the space photovoltaic generation system according to the embodiment 3 is the same as that in the embodiment 1 previously described with reference to FIG. 1 except that the electric power transmitted from each of power generation satellites 4 is changed like a taper in response to the distance from the center position of a power generation satellite group 3.

The receiving power efficiency of the space photovoltaic generation system according to the embodiment 3 will be discussed. FIGS. 7(a) and 7(b) show the characteristics of the radiation field distribution and the receiving power efficiency as an array antenna formed by the power generation satellite group 3 when the electric power transmitted from each of the power generation satellites 4 is given as a Gauss distribution in response to the distance from the center position of the power generation satellite group 3. FIGS. 7(a) and 7(b) assume that wavelength λ of a microwave 10 is 52 mm (frequency 5.8 GHz), that power generation satellites 4 are placed in an equilateral triangle arrangement with a spacing of 300 m, that the aperture distribution of a transmitting antenna 9 mounted on each of the power generation satellites 4 is uniform, that the aperture diameter of the transmitting antenna 9 is 200 m, that the number of the power generation satellites, N, is 7, and that distance d between the transmitting antenna 9 and a receiving antenna 12 can be assumed to be a Fraunhofer region.

From FIGS. 7(a) and 7(b), it is seen that the receiving power efficiency changes depending on the edge level when the electric power transmitted from each of the power generation satellites 4 is changed like a taper in response to the distance from the center position of the power generation satellite group 3 and that the receiving power efficiency at the offset angle passing through the first null point of the radiation field distribution reaches the highest when the edge level is about −10 dB.

Therefore, to give the aperture diameter of the receiving antenna 12 based on the magnitude corresponding to the first null point of the radiation field distribution based on the array antenna formed by the power generation satellite group 3, the receiving power efficiency can be still more enhanced as compared with that when the transmitting antenna 9 exists singly.

Here, the Gauss distribution is used as the tapered distribution, but a distribution, such as a Taylor distribution or a Chebyshev distribution may be used.

Embodiment 4.

A space photovoltaic generation system according to an embodiment 4 of the invention will be discussed. The configuration of the space photovoltaic generation system according to the embodiment 4 is the same as that in the embodiment 1 previously described with reference to FIG. 1 except that a transmitting antenna 9 is an array antenna and functions as a subarray of an array antenna formed by a power generation satellite group 3.

Microwave control unit 7 of each of power generation satellites 4 controls the phase excited at the transmitting antenna 9 so as to provide common phase in the direction of a power base 11 in response to the positions and the attitudes of the power generation satellites 4. At this time, when the boresight direction (main lobe direction) of the transmitting antenna 9 of each of the power generation satellites 4 making up the power generation satellite group 3 differs from the direction of the power base 11, if the excited phase of each power generation satellite 4 is controlled so as to become the common phase in the direction of the power base 11, the gain of the array antenna formed by the power generation satellite group 3 is also lowered in response to the lowered gain portion of each transmitting antenna 9 as an element of the array antenna formed by the power generation satellite group 3 in the direction of the power base 11, degrading the receiving power efficiency.

Then, in the embodiment 4, the boresight direction of not only the array antenna formed by the power generation satellite group 3, but also the transmitting antenna 9 implemented as an array antenna functioning as a subarray antenna is controlled in response to the attitude of each power generation satellite 4 so that it is directed to the power base 11.

Therefore, if the attitudes of the power generation satellites 4 get out of order, degradation of the receiving power efficiency can be minimized.

Embodiment 5.

A space photovoltaic generation system according to an embodiment 5 of the invention will be discussed. The configuration of the space photovoltaic generation system according to the embodiment 5 is the same as that in the embodiment 1 previously described with reference to FIG. 1 except that a transmitting antenna 9 is an array-fed reflector antenna.

Figure 8:
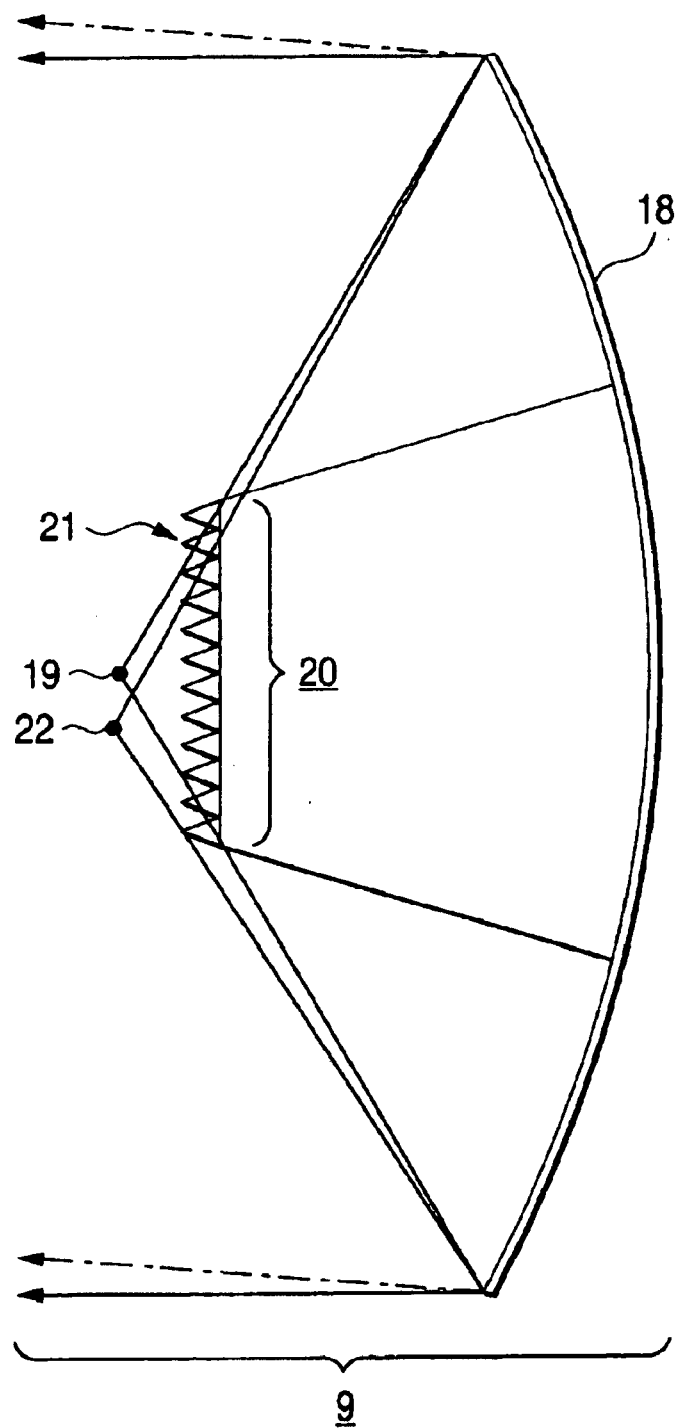
FIG. 8 is a drawing to show the configuration of an array-fed reflector antenna as a transmitting antenna of a space photovoltaic generation system according to embodiment 5 of the invention.
Figure 9:
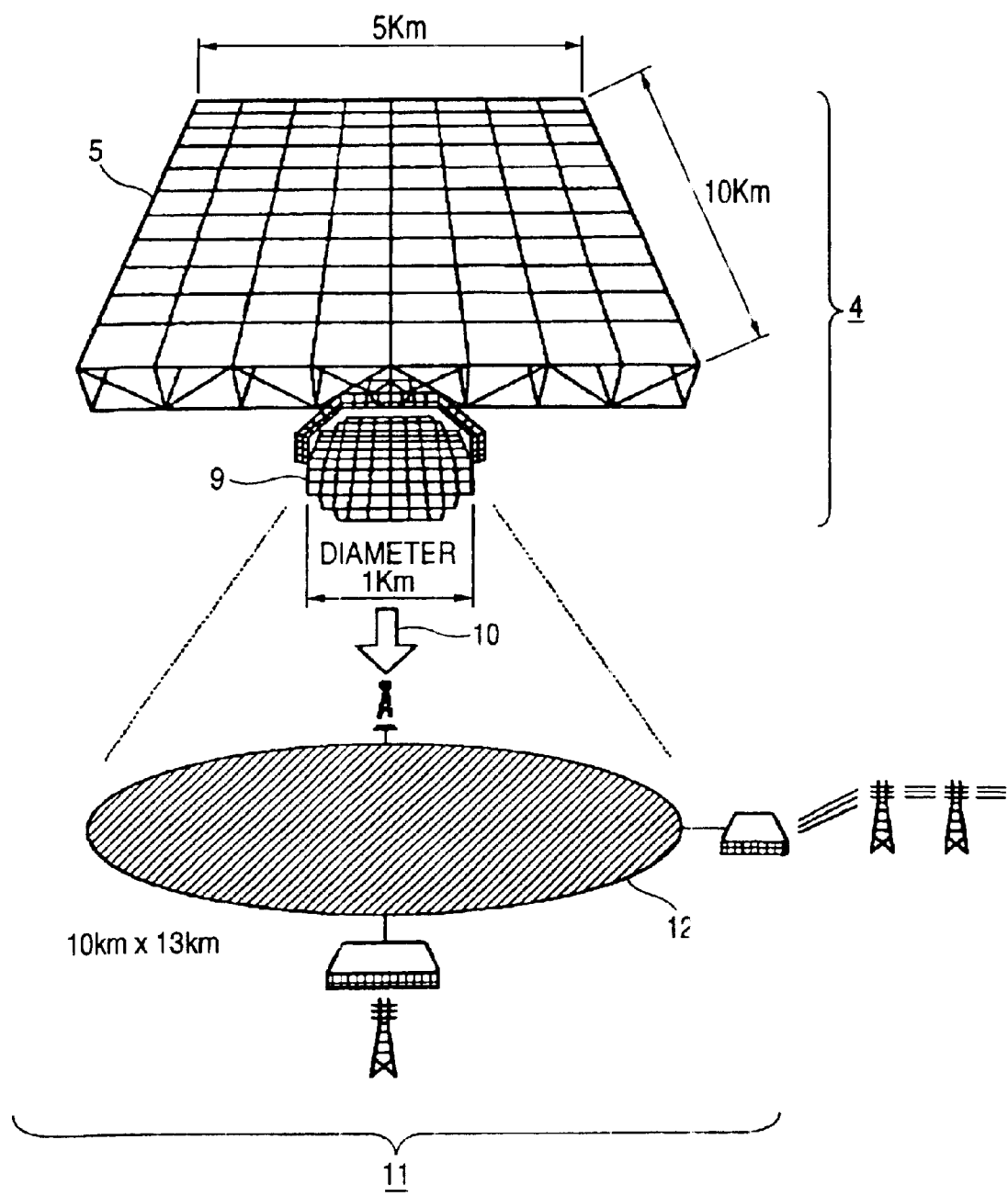
FIG. 9 is drawing to show the configuration of a space photovoltaic generation system in a related art.
Figures 10A, 10B:
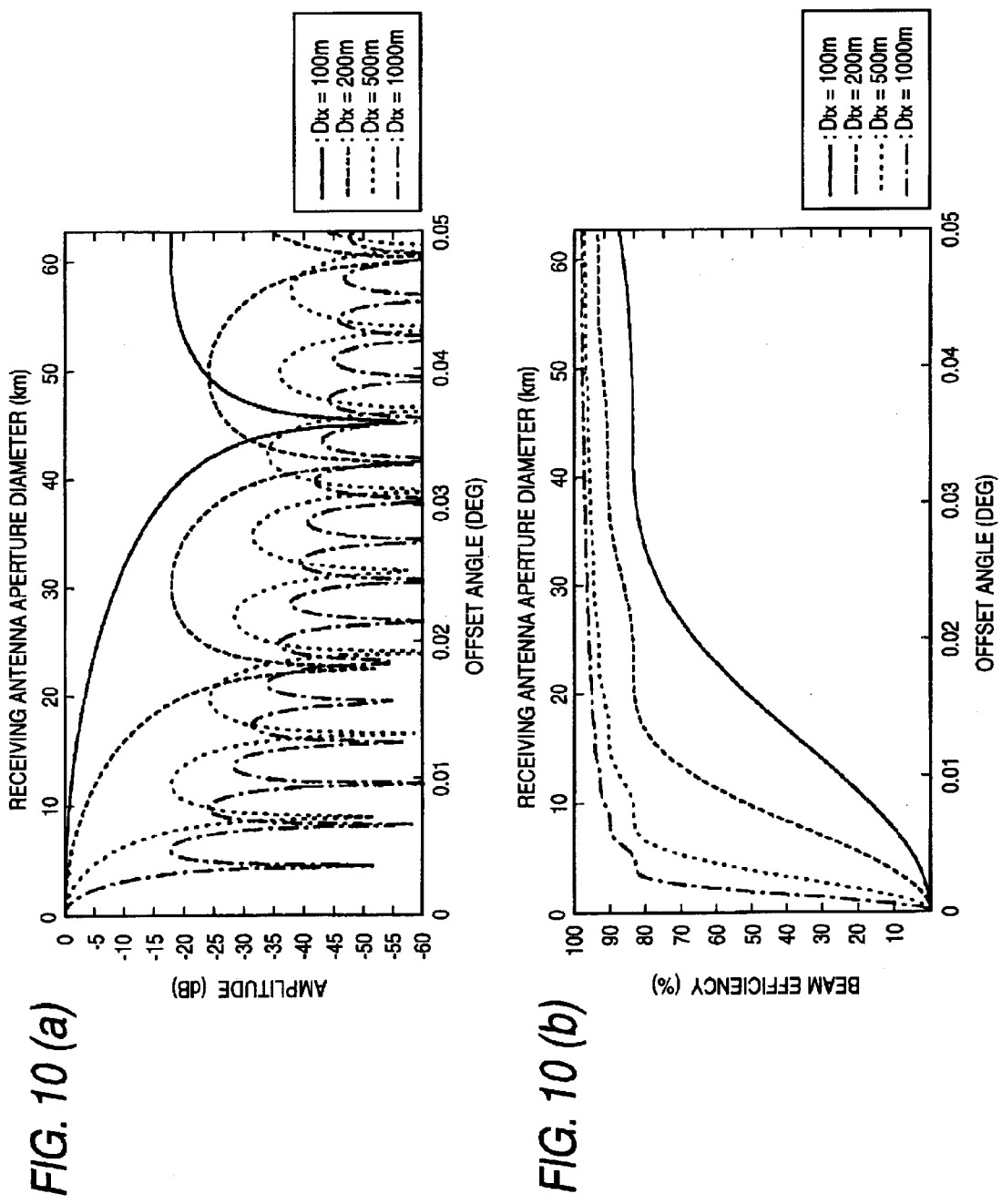
FIGS. 10(a) and 10(b) are schematic representations to show the relationships between antenna aperture diameter and radiation field distribution and receiving power efficiency.

FIG. 8 shows the configuration of the array-fed reflector antenna. Numeral 9 denotes the transmitting antenna, which is the same as that in FIG. 1. Numeral 18 denotes a parabolic reflecting mirror, numeral 19 denotes a focus of the parabolic reflecting mirror 18, numeral 20 denotes a primary radiator array, numeral 21 denotes each of primary radiator elements making up the primary radiator array 20, and numeral 22 denotes a focus at the beam scanning time.

In FIG. 8, the primary radiator array 20 is an array antenna having the primary radiator elements 21 as element antennas; usually, a phase distribution is given so as to excite the sphere-shaped wave surface with the focus 19 of the parabolic reflecting mirror 18 as the center. At this time, a microwave radiated from the primary radiator array 20 is formed as a plane wave through the parabolic reflecting mirror 18 and propagates in a mirror axis direction. To change the direction of the beam radiated from the parabolic reflecting mirror 18, the excitation phase of the primary radiator array 20 is set as if a spherical wave were radiated from the corresponding focus position. Beam scanning can be conducted thus using the array power supply reflecting mirror.

Therefore, as described in the embodiment 4 of the invention, if the attitudes of the power generation satellites 4 get out of order, degradation of the receiving power efficiency can be minimized by controlling the boresight direction of each transmitting antenna 9.

The transmitting antenna 9 is an array-fed reflector antenna, whereby the number of elements for controlling the excitation amplitude phase is determined by the area of the primary radiator array rather than the aperture area of the parabolic reflecting mirror 18 and therefore can be decreased.

In the embodiment 5, the array-fed reflector antenna having only one parabolic reflecting mirror as a reflecting mirror is taken as an example of the array-fed reflector antenna, but an array-fed reflector antenna having a plurality of reflecting mirrors may be adopted.

As described above, according to the first aspect of the invention, there is provided a space photovoltaic generation system having a plurality of power generation satellites each having a photoelectric conversion unit for converting sunlight into electric energy, a transmission frequency conversion unit for performing frequency conversion of the electric energy provided by the photoelectric conversion unit to a microwave, a microwave control unit for controlling at least one of the amplitude and the phase of the microwave output by the transmission frequency conversion unit, and a transmitting antenna for radiating the microwave, and a power base having a receiving antenna for receiving the microwave radiated from the power generation satellites and a reception frequency conversion unit for performing frequency conversion of the microwave received at the receiving antenna to one of DC and low-frequency commercial power, wherein the plurality of power generation satellites are placed in space to form a power generation satellite group and a first array antenna having the transmitting antennas of the power generation satellites in the power generation satellite group as element antennas is formed. Thus, the space photovoltaic generation system has the advantage that to give the aperture diameter of the receiving antenna within the range of the magnitude corresponding to the main lobe of the radiation field distribution based on the array antenna formed by the power generation satellite group, electric power can be transmitted from the power generation satellite group to the power base without much impairing the receiving power efficiency as compared with the case where the transmitting antenna which forms the same aperture area as the whole array antenna formed by the power generation satellite group exists singly.

To give the aperture diameter of the receiving antenna within the range of the magnitude corresponding to the first grating lobe of the radiation field distribution when the transmitting antennas are put into an array, the receiving power efficiency can be enhanced as compared with that when the transmitting antenna exists singly.

If the number of the power generation satellites changes, the receiving power efficiency equivalent to that of the single transmitting antenna which forms the same aperture area as the whole array antenna formed by the power generation satellite group is provided, so that while power generation satellites are added in sequence, the generated electric power and the power generation efficiency of the space photovoltaic generation system can be enhanced.

The transmitting antenna of the power generation satellite can be made smaller than the single transmitting antenna which forms the same aperture area as the whole array antenna formed by the power generation satellite group, so that the load at launching time with a rocket, etc., can be lessened.

According to the second aspect of the invention, there is provided the space photovoltaic generation system according to the first aspect, wherein the aperture amplitude distribution of the transmitting antenna is made a tapered distribution. Thus, the space photovoltaic generation system has the advantage that to give the aperture diameter of the receiving antenna within the range of the magnitude corresponding to the first grating lobe or more of the radiation field distribution based on the array antenna formed by the power generation satellite group, the receiving power efficiency can be still more enhanced as compared with that when the transmitting antenna exists singly.

According to the third aspect of the invention, there is provided the space photovoltaic generation system according to any one of the first and second aspects, wherein electric power transmitted from each of the power generation satellites is changed like a taper in response to the distance from a center position of the power generation satellite group. Thus, the space photovoltaic generation system has the advantage that to give the aperture diameter of the receiving antenna based on the magnitude corresponding to the first null point of the radiation field distribution based on the array antenna formed by the power generation satellite group 3, the receiving power efficiency can be still more enhanced as compared with that when the transmitting antenna 9 exists singly.

According to the fourth aspect of the invention, there is provided the space photovoltaic generation system according to any one of the first to third aspects, wherein the transmitting antenna of the power generation satellite is an second array antenna. Thus, the space photovoltaic generation system has the advantage that if the attitudes of the power generation satellites 4 get out of order, degradation of the receiving power efficiency can be minimized.

According to the fifth aspect of the invention, there is provided the space photovoltaic generation system according to any one of the first to third aspects, wherein the transmitting antenna of the power generation satellite is an array-fed reflector antenna. Thus, the space photovoltaic generation system has the advantage that if the attitudes of the power generation satellites 4 get out of order, degradation of the receiving power efficiency can be minimized and that the number of elements contained in the transmitting antenna 9 can be decreased.

What is claimed is:

1. A space photovoltaic generation system comprising:
    a plurality of power generation satellites each having:
        a photoelectric conversion unit for converting sunlight into electric energy;
        a transmission frequency conversion unit for performing frequency conversion of the electric energy provided by the photoelectric conversion unit to a microwave;
        a microwave control unit for controlling at least one of the amplitude and the phase of the microwave output by the transmission frequency conversion unit; and
        a transmitting antenna for radiating the microwave;
    a power base having:
        a receiving antenna for receiving the microwave radiated from the plurality of power generation satellites; and
        a reception frequency conversion unit for performing frequency conversion of the microwave received at the receiving antenna to one of DC and low-frequency commercial power,
    wherein the plurality of vower generation satellites are placed in space to form a power generation satellite group,
    wherein a first array antenna having the transmitting antennas of the plurality of power generation satellites in the power generation satellite group as element antennas is formed, and
    wherein the aperture amplitude distribution of each transmitting antenna of the plurality of power generation satellites is made a tapered distribution.

2. A space photovoltaic generation system comprising:
    a plurality of power generation satellites each having:
        a photoelectric conversion unit for converting sunlight into electric energy;
        a transmission frequency conversion unit for performing frequency conversion of the electric energy provided by the photoelectric conversion unit to a microwave;
        a microwave control unit for controlling at least one of the amplitude and the phase of the microwave output by the transmission frequency conversion unit; and
        a transmitting antenna for radiating the microwave;
    a power base having:
        a receiving antenna for receiving the microwave radiated from the plurality of power generation satellites; and
        a reception frequency conversion unit for performing frequency conversion of the microwave received at the receiving antenna to one of DC and low-frequency commercial power,
    wherein the plurality of power generation satellites are placed in space to form a power generation satellite group,
    wherein a first array antenna having the transmitting antennas of the plurality of power generation satellites in the power generation satellite group as element antennas is formed, and
    wherein electric power transmitted from each of the plurality of power generation satellites is changed in a form of a taper in response to the distance from a center position of the power generation satellite group.

3. A space photovoltaic generation system comprising:
    a plurality of power generation satellites each having:
        a photoelectric conversion unit for converting sunlight into electric energy;
        a transmission frequency conversion unit for performing frequency conversion of the electric energy provided by the photoelectric conversion unit to a microwave;
        a microwave control unit for controlling at least one of the amplitude and the phase of the microwave output by the transmission frequency conversion unit; and
        a transmitting antenna for radiating the microwave;
    a power base having:
        a receiving antenna for receiving the microwave radiated from the plurality of power generation satellites; and
        a reception frequency conversion unit for performing frequency conversion of the microwave received at the receiving antenna to one of DC and low-frequency commercial power.
    wherein the plurality of power generation satellites are placed in space to form a power generation satellite group,
    wherein a first array antenna having the transmitting antennas of the plurality of power generation satellites in the power generation satellite group as element antennas is formed, and
    wherein each transmitting antenna of the plurality of power generation satellites is a second array antenna.

4. A space photovoltaic generation system comprising:
    a plurality of power generation satellites each having:
        a photoelectric conversion unit for converting sunlight into electric energy;
        a transmission frequency conversion unit for performing frequency conversion of the electric energy provided by the photoelectric conversion unit to a microwave;
        a microwave control unit for controlling at least one of the amplitude and the phase of the microwave output by the transmission frequency conversion unit; and
        a transmitting antenna for radiating the microwave;
    a power base having:
        a receiving antenna for receiving the microwave radiated from the plurality of power generation satellites; and
        a reception frequency conversion unit for preforming frequency conversion of the microwave received at the receiving antenna to one of DC and low-frequency commercial power,
    wherein the plurality of power generation satellites are placed in space to form a power generation satellite group,
    wherein a first array antenna having the transmitting antennas of the plurality of power generation satellites in the power generation satellite group as element antennas is formed, and
    wherein each transmitting antenna of the plurality of power generation satellites is an array-fed reflector antenna.

* * * * *

UNITED STATES PATENT AND TRADEMARK OFFICE
CERTIFICATE OF CORRECTION

PATENT NO. : 6,723,912 B2  Page 1 of 1
DATED : April 20, 2004
INVENTOR(S) : Tomohiro Mizuno et al.

It is certified that error appears in the above-identified patent and that said Letters Patent is hereby corrected as shown below:

Column 13,
Line 27, change "vower" to -- power --.

Signed and Sealed this

Sixteenth Day of November, 2004

JON W. DUDAS
*Director of the United States Patent and Trademark Office*